C. H. CRATER.
SELF-WATERING FLOWER-VASES.

No. 195,580. Patented Sept. 25, 1877.

WITNESSES
Franck L. Ouraud
Frank H. Duffy

INVENTOR
Chas. H. Crater
per C. H. Watson & Co. ATTORNEYS

UNITED STATES PATENT OFFICE.

CHARLES H. CRATER, OF OWEGO, NEW YORK.

IMPROVEMENT IN SELF-WATERING FLOWER-VASES.

Specification forming part of Letters Patent No. 195,580, dated September 25, 1877; application filed August 3, 1877.

*To all whom it may concern:*

Be it known that I, CHARLES H. CRATER, of Owego, in the county of Tioga and State of New York, have invented certain new and useful Improvements in Self-Watering Flower-Vases; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a self-watering flower-vase, as will be hereinafter more fully set forth.

Figure 1:
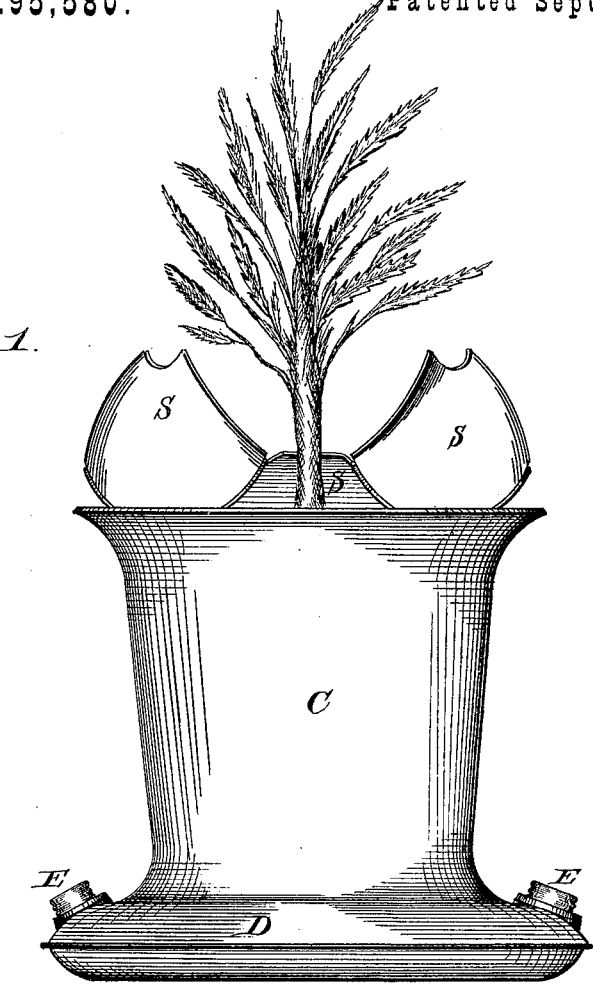
Figure 2:
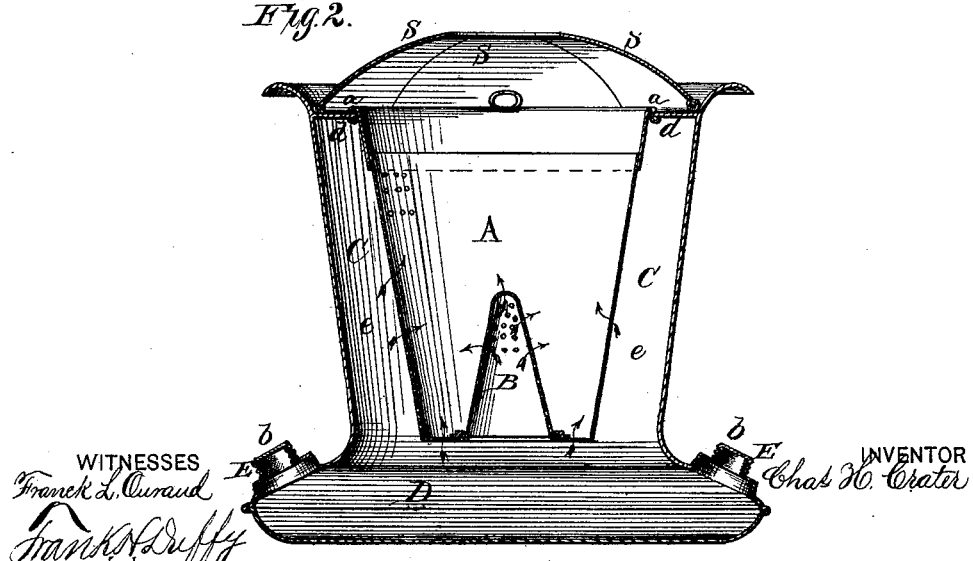

In the annexed drawing, to which reference is made, Figure 1 is a side elevation of my invention, and Fig. 2 is a central vertical section of the same.

A represents the flower-pot proper, made of perforated sheet metal, terra-cotta, or any other suitable material, and provided around its upper edge with a projecting bead or flange, $a$, substantially as shown.

The bottom of the pot A is perforated the same as the body, and from said bottom extends upward into the pot one or more perforated cones, B.

This cone or cones may be of any desired height, and are intended to be made removable, so that they can be taken out and others of different size substituted.

C represents an exterior case or vase, formed at the bottom with an enlarged reservoir, D, which constitutes the base, and in the top of said reservoir are made one or more inlets, $b\ b$, provided with screw-caps E E.

Near the top of the vase C is an inwardly-projecting flange, $d$, of such dimensions that, when the pot A is placed within the vase, the bead $a$ around the upper end of the flower-pot will rest upon the inner edge of the flange $d$, and the pot be supported thereby.

The relative dimensions of the flower-pot A and vase C should in all cases be such that a space will be formed between them, as shown at $e\ e$ in Fig. 2.

At the top of the vase C, at or near the outer edge of the flange $d$, are hinged a series of segmental shields, S S, which are so constructed that when closed down inward they will leave a central opening through which the stem of the plant will project, said shields then forming a complete cover to protect the plant from cold. The cover thus formed, being made in sections, can be used to either partially or entirely cover the plant, and the different sections or shields may be left in a raised position to protect the plant from the sun or wind.

It will be seen that, when the flower-pot A is inserted in the vase, the latter is perfectly air-tight; and the reservoir D being filled with water, all the evaporation from the water will necessarily pass through the perforations in the pot, and be absorbed in the earth contained therein to be supplied to the plant.

In case such evaporation should be so great as to supply too much moisture to the plant, one or more of the screw-caps E may be removed to admit air and allow the surplus moisture to pass off.

The exterior casing or vase C, with its reservoir D, may be made of any desired dimensions; and it is the intention to make the reservoir, in many cases, sufficiently large to contain ten to fifteen gallons of water, more or less, which would last for several months, perhaps for an entire season, and thus continually keep the plants in good condition.

By leaving one or more of the shields S open, I can also regulate the moisture supplied to the plant, as more or less of the moisture will be evaporated and pass off according to the number of shields left open.

Having thus fully described my invention, what I claim as new, and desire to secure by Letters Patent, is—

1. The combination of a perforated flower-pot and an exterior casing or vase, C, provided with a water-reservoir, D, at the bottom, and constructed to form a close chamber, $e$, all around the flower-pot, substantially as and for the purposes herein set forth.

2. The hinged segmental shields S, in combination with the vase C, for the purposes herein set forth.

In testimony that I claim the foregoing as my own I have hereto affixed my signature in presence of two witnesses.

CHARLES H. CRATER.

Witnesses:
C. H. WATSON,
FRANK GALT.